(12) United States Patent
Fujita et al.

(10) Patent No.: US 7,053,518 B2
(45) Date of Patent: May 30, 2006

(54) ROTOR FOR DYNAMO-ELECTRIC MACHINE

(75) Inventors: Masahiko Fujita, Tokyo (JP); Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/979,218

(22) Filed: Nov. 3, 2004

(65) Prior Publication Data

US 2005/0116581 A1  Jun. 2, 2005

(51) Int. Cl.
*H02K 1/22* (2006.01)

(52) U.S. Cl. ...................................... 310/263
(58) Field of Classification Search ............... 310/263
See application file for complete search history.

(56) References Cited

U.S. PATENT DOCUMENTS 6,013,967 A * 1/2000 Ragaly et al. ............... 310/263
6,369,486 B1 * 4/2002 Armiroli et al. ............ 310/263
6,426,581 B1 * 7/2002 York et al. .................. 310/263
6,933,654 B1 * 8/2005 Isoda et al. ................. 310/263

FOREIGN PATENT DOCUMENTS

| JP | 3-159549 A | 7/1991 |
| JP | 6-78479 A | 3/1994 |
| JP | 7-131946 A | 5/1995 |

* cited by examiner

*Primary Examiner*—Burton Mullins
(74) *Attorney, Agent, or Firm*—Sughrue Mion, PLLC

(57) ABSTRACT

The invention provides a rotor for a dynamo-electric machine which is capable of reducing deformation of magnetic poles due to centrifugal force or noise generated by vibrations without deteriorating characteristics of the dynamo-electric machine. The rotor includes a plurality of deformation preventing members. Each of the deformation preventing members is attache on each magnetic. Each of the deformation preventing members has elongated portion pressed to aginst to the side wall of the magnetic poles. A first deformation preventing members attached on the first magnetic poles and a second deformation preventing members attached on the second magnetic poles also are used. The first and second deformation preventing menber are holded to one another.

15 Claims, 10 Drawing Sheets

ROTOR FOR DYNAMO-ELECTRIC MACHINE

BACKGROUND OF THE INVENTION

1. Field of the Invention

The present invention relates to a structure of a rotor for a dynamo-electric machine to be mounted to a vehicle and, more specifically, to a structure of a rotor which can resist high velocity revolution and is capable of reducing noise.

2. Description of the Related Art

A dynamo-electric machine to be mounted to a vehicle, more specifically, an alternating-current generator, is increased in velocity by an internal combustion engine. Therefore, it is rotated at a high velocity near the critical limit, and hence various measures against the centrifugal force or against noise are proposed. In JP03-159549A (prior art 1), as a measure against noise, there is disclosed a Lundel-type alternating current generator including a claw-pole type rotor, in which rings (caps) formed of non-magnetic steel are fitted to both ends of a rotor, and the rings are provided with tongue strips for pressing the distal portion of claw-shaped magnetic poles on the opposite side, so that a wind sound generated when being driven at a low velocity and noise generated due to vibrations of the claw-shaped magnetic pole when being driven at a high velocity are reduced.

JP06-077479A (prior art 2) discloses a technology in which rings being formed of non-magnetic steel and having flat portions by the same number as the magnetic poles of the rotor integrally formed by press process are provided on both sides of the rotor, the surfaces of the flat portion that come into abutment with a disk portion of the rotor are welded with the disk portion, and the surfaces of the flat portion that come into abutment with the distal portion of the claw-shaped magnetic poles of the rotor are welded or engaged with the distal portions of the claw-shaped magnetic poles, so that the distal portions of the claw-shaped magnetic poles are fixed to the disk portion of the adjacent rotor, thereby preventing widening of the distal portions of the magnetic poles due to the centrifugal force during high-velocity revolution.

Furthermore, JP07-131946 (prior art 3) discloses a rotor having a first rotor core and a second rotor core having a number of so-called "claw-pole type" claw-shaped magnetic poles, in which a non-magnetic ring for connecting the distal portions of the claw-shaped magnetic poles on one side and the roots of the other claw-shaped magnetic poles on the other side is provided, the claw-shaped magnet poles are formed with grooves for fitting the non-magnetic ring, and the non magnetic ring is welded to the respective claw-shaped magnetic pole, so that the distal portions of the claw-shaped magnetic poles are prevented from being deformed outward due to the centrifugal force generated during high-velocity revolution.

As described above, in the dynamo-electric machine to be mounted to a vehicle, the reason why the non-magnetic ring is mounted to the claw-shaped magnetic poles is to prevent deformation due to the centrifugal force or to reduce vibrations or noise. However, in the technologies in the related art, the claw-shaped magnetic poles that define magnetic path are partially cut off in order to attach the non magnetic ring, which may result in reduction of cross sectional area of the magnetic path or reduction of void area and hence lowering of the performance cannot be avoided.

For example, in the technology disclosed in prior art 1, slight reduction of the cross sectional area of the magnetic path results, and in a state in which the centrifugal force is significant, the distal portions of the claw-shaped poles may come off the ring. Consequently, vibration preventing effect does not work anymore, and hence the effect of noise prevention is deteriorated and, in addition, cooling effect is also deteriorated by using the non-magnet ring or cap, whereby output as the dynamo-rotary machine must be sacrificed. Also, in the technologies disclosed in prior art 2 or prior art 3, reduction of the cross-sectional area of the magnetic circuit or reduction of the void area cannot be avoided. In particular, in the case of prior art 3, if after-treatment after welding is not complete, there is a risk of damaging the end of the coil on a stator side.

SUMMARY OF THE INVENTION

In order to solve such a problem, it is an object of the invention to provide a rotor for a dynamo-electric machine which can reduce deformation due to centrifugal force or generation of noise in association with vibrations of claw-shaped magnetic pole without deteriorating characteristics of a magnetic circuit and hence without deteriorating characteristics of a dynamo-electric machine.

As one aspect of the invention, a rotor for a dynamo-electric machine includes a rotating shaft, a field winding, and a first and second rotor cores.

Each of the first and second rotor core has a cylindrical portion, a disk portion and a plurality of magnetic poles, the cylindrical portion of each of the first and second rotor cores is fixed to the rotating shaft and the field winding is disposed on the cylindrical portions of the first and second rotor cores, the disk portion of each of the first and second rotor cores is provided so as to extend from the cylindrical portion to its outer, the plurality of magnetic poles of each of the first and second rotor cores extend from the disk portion to the outer portion of the field winding so to form the spaces between each of adjacent magnetic poles, each of the plurality of magnetic poles of the first rotor core extends to each of the spaces between adjacent magnetic poles of the second rotor core, and each of the plurality of magnetic poles of the second rotor core extends to each of spaces between each adjacent magnetic poles of the first rotor core.

The rotor further includes a plurality of deformation preventing members of non-magnetic material, each of the deformation prevent members is fixed on each of magnetic poles of the first rotor core, and each of the deformation preventing members has elongated portion, the elongated portion is pressed against to the side wall of each of magnetic poles of the second rotor core at a predetermined pressing force.

In the rotor on one aspect of the invention, each of the plularity of deformation preventing members is attached on each of magnetic poles of the first rotor core. By this structure, it is not necessary to partially cut off the magnetic poles of the first rotor core for attaching the deformation preventing members to the magnetic poles of the first rotor core, therefore, it can be avoid the deteriorating characteristics of a magnetic circuit upon the deformation preventing members and the deteriorating characteristics of a dynamo-electric machine. Also, each of deformation preventing members attached to each of the magnetic poles of the first rotor core does not make to prevent a flow of cooling wind in the axial direction of rotating shaft, therefore, it can be improve the cooling effect in the rotor.

As another aspect of the invention, a rotor for a dynamo-electric machine includes a rotating shaft, a field winding, and a first and second rotor cores.

Each of the first and second rotor core has a cylindrical portion, a disk portion and a plurality of magnetic poles, the cylindrical portion of each of the first and second rotor cores is fixed to the rotating shaft and the field winding is disposed on the cylindrical portions of the first and second rotor cores, the disk portion of each of first and second rotor cores is provided so as to extend from the cylindrical portion to its outer, the plurality of magnetic poles of each of the first and second rotor cores extend from the disk portion to the outer portion of the field winding so as to form the spaces between each of adjacent magnetic poles, each of the plurality of magnetic poles of the first rotor core extends to each of the spaces between adjacent magnetic poles of the second rotor core, and each of the plurality of magnetic poles of the second rotor core extends to each of the spaces between adjacent magnetic poles of the first rotor core.

The rotor further includes a plurality of first and second deformation preventing members of non-magnetic material, each of the first deformation prevent members is attached on each of magnetic poles of the first rotor core, each of the second deformation preventing members is attached on each of magnetic poles of the second rotor core, and each of the first deformation preventing members and each of the second deformation preventing menmers are combined to each other at a gap formed between each one of the magnetic poles of the first rotor core and each one of the magnetic poles of the second rotor core adjacent to the one of magnetic poles of the first rotor core so that each one of the first deformation preventing member and the second deformation preventing member prevents an outerwardly movement of other of the first deformation preventing member and the second deformation preventing member In the rotor on another aspect of the invention, each of the first deformation preventing members is attached on each of magnetic poles of the first rotor core and each of the second deformation preventing members is attached on each of magnetic poles of the second rotor core. By this structure, it is not necessary to partially cut off the magnetic poles of the first and second rotor cores for attaching the first and second deformation preventing members to the magnetic poles of the first and second rotor core, therefore, it can be avoid the deteriorating characteristics of a magnetic circuit upon the deformation preventing members and the deteriorating characteristics of a dynamo-electric machine. Also, each of deformation preventing members attached to each of the magnetic poles of the first rotor core does not make to prevent a flow of cooling wind in the axial direction of rotating shaft, therefore, it can be, improve the cooling effect in the rotor.

DESCRIPTION OF THE PREFERRED EMBODIMENTS

First Embodiment

Figure 1:
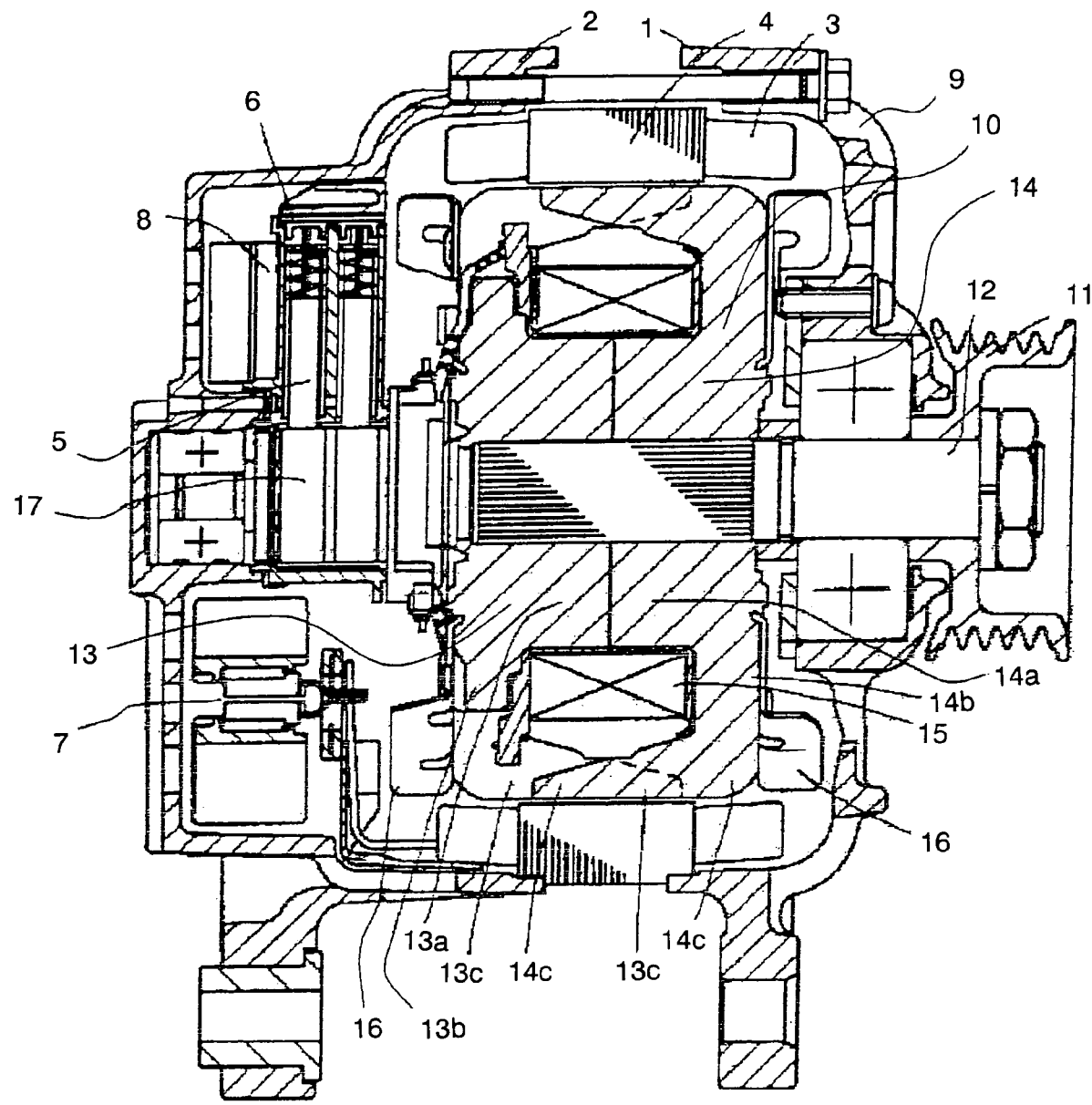
FIG. 1 is a cross-sectional view illustrating a general structure of a dynamo-electric machine including description of a rotor for the dynamo-electric machine according to a first embodiment of the invention.
Figure 2:
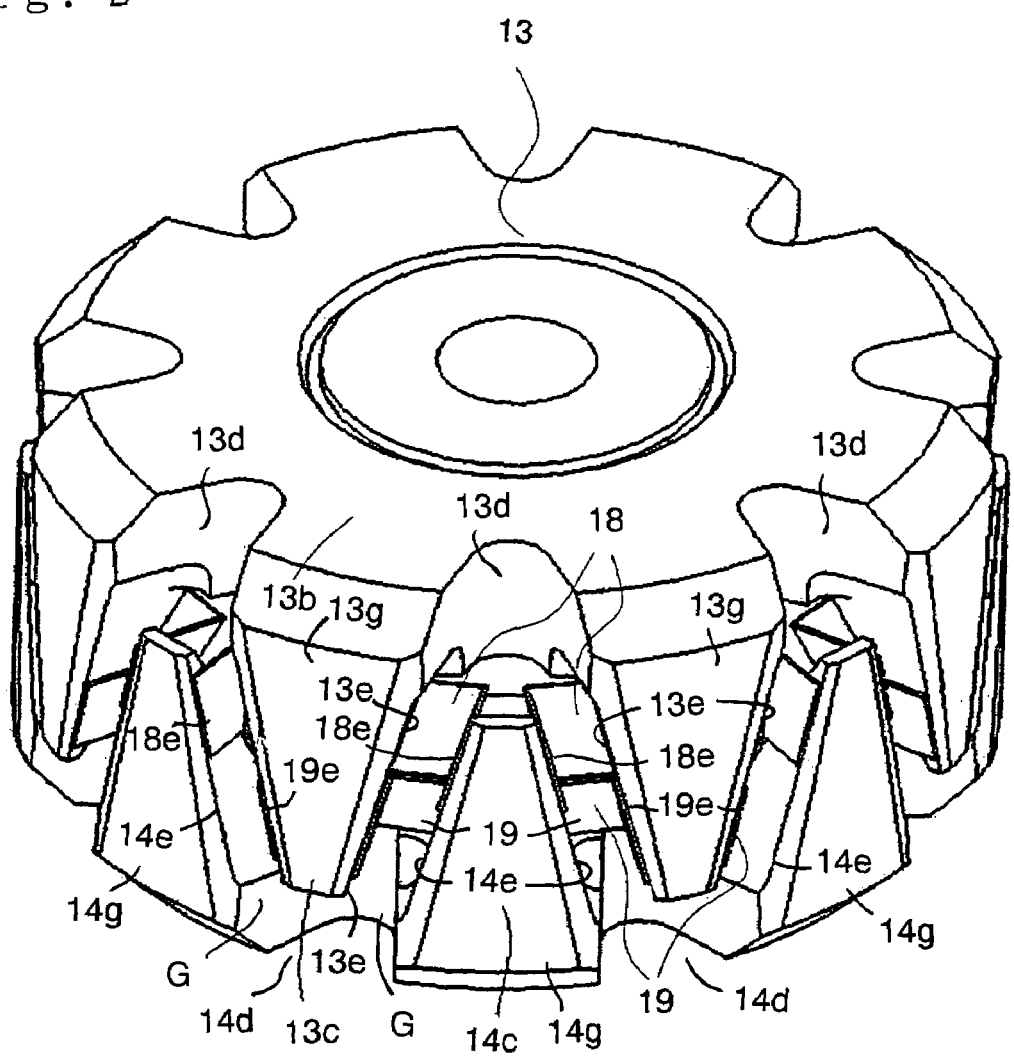
FIG. 2 is a perspective view illustrating the rotor for the dynamo-electric machine according to the first embodiment of the invention.
Figure 3:
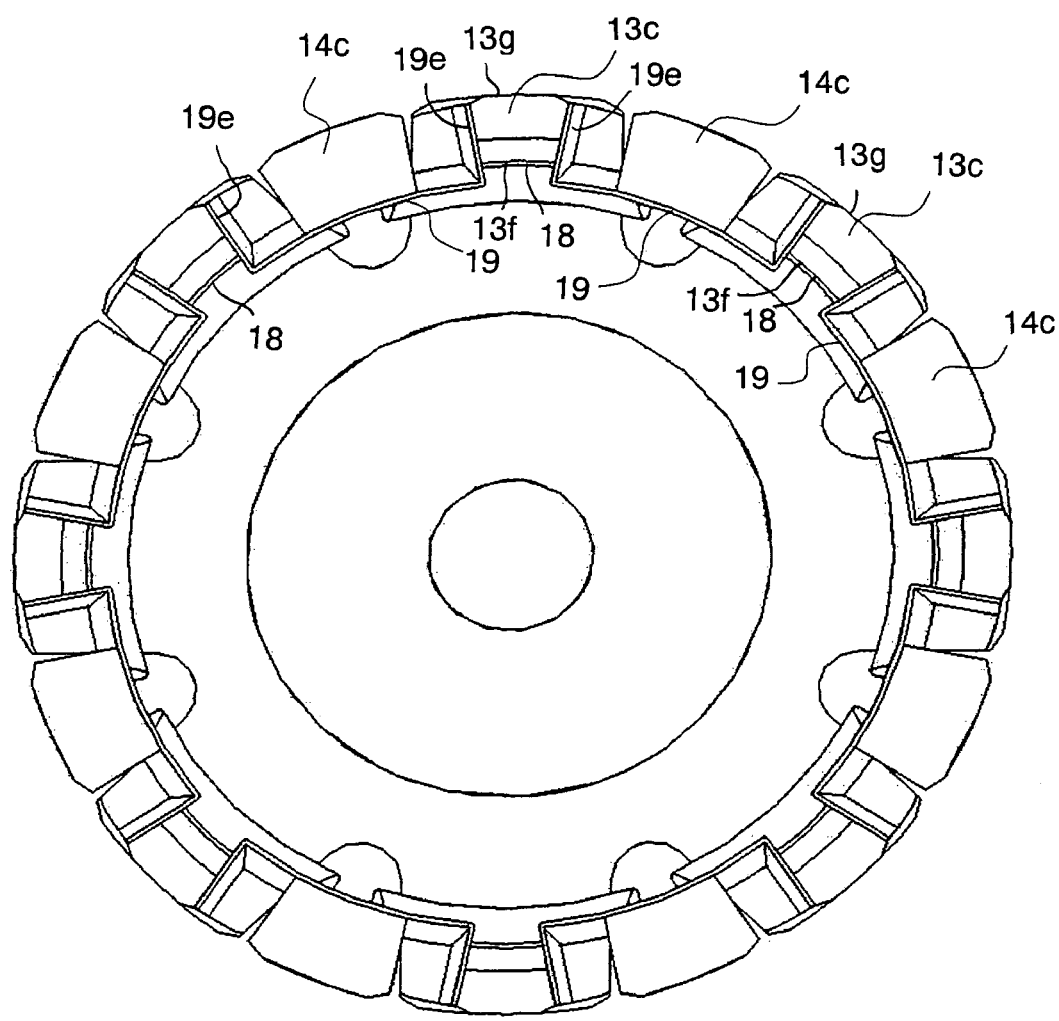
FIG. 3 is an explanatory drawing illustrating the structure of the rotor for the dynamo-electric machine according to the first embodiment of the invention.

FIG. 1 to FIG. 3 illustrate a rotor for a dynamo-electric machine according to a first embodiment of the invention. FIG. 1 is a cross-sectional view illustrating a general structure of the dynamo-electric machine, FIG. 2 is a perspective view showing the structure of the rotor, and FIG. 3 is a cross-sectional view of the rotor taken along a plane vertical to the revolving shaft for providing a supplementary explanation of the structure shown in FIG. 2. This dynamo-electric machine is to be used as an alternating current generator for a vehicle, or as a synchronous motor for a vehicle. Typically, this dynamo-electric machine is a Lundel-type alternating current generator.

A general structure of the dynamo-electric machine will be described below. Referring now to FIG. 1, the dynamo-electric machine includes a front bracket 1 and a rear bracket 2 formed of aluminum, an armature iron core 4 clamped therebetween and having an armature winding 3, a brush retainer 6 provided on the rear bracket 2 and having a brush 5, a rectifier 7 that rectifies an alternate current outputted from the armature winding 3, a stator 9 having a regulator 8 for controlling output voltage of the armature winding 3, and a rotor 10 that will be described below.

The rotor 10 is a claw-pole type rotor. The rotor 10 includes a rotating shaft 12 to which a pulley 11 is fixed at one end, first and second of claw-pole type rotor iron cores 13, 14 fixed to the rotating shaft 12, a magnetic field winding 15 wounded around the rOtor iron cores 13, 14, a fan 16 fixed to both end surfaces of the rotor iron cores 13, 14, and a sup ring 17 fixed to the other end of the rotating shaft 12 for supplying direct current from the brush 5 to the magnetic field winding 15. The first and second rotor iron cores 13 and 14 are of magnetic material, and include cylindrical portions 13a, 14a on which magnetic field windings 15 are wound, disk portions 13b, 14b extending from the cylindrical portions 13a, 14a and a plurality of magnetic poles 13c, 14c.

Typically, in 8 poles rotor 10, the first rotor iron core 13 includes 8 magnetic poles 13c and the second rotor iron core 14 includes 8 magnetic poles 14c. When the field winding 15 is energized by a direct current, magnetic poles 13c of the first rotor iron core 13 are magneticllay energized with N-polarity and magnetic poles 14c of the second rotor iron core 14 are magnetically energized with S-polarity by the field winding 15.

Each of the magnetic poles 13c of first iron core 13 extends from the disk portion 13b to the outer portion of the field winding 15. The plurality of the magnetic poles 13c form a plurality of spaces 13d. Each of the spaces 13d is formed between the adjacent two of the magnetic poles 13c. As each of the magnetic poles 13c of the first rotor iron core 13 has a substantially triangle shape, each of the spaces 13d also has a substantially triangle shape. Each of the magnetic poles 13c has a pair of side walls 13e opposing to one another, a inner wall 13f and a outer wall 13g. The inner wall 13f of each magnetic poles 13 opposes to the field winding 15 and the outer wall 13g of each magnetic poles 13 opposes to the inner surface of the armature iron core 4 via small outer air gap.

Each of the magnetic poles 14c of the second iron core 14 extends from the disk portion 14b to the outer portion of the field winding 15. The plurality of the magnetic poles 14c form a plurality of speces 14d. Each of the spaces 14d is formed between the adjacent two of the magnetic poles 14c. As each of the magnetic poles 14c of the second rotor iron core 14 has a substantially triangle shape, each of the spaces 14d also has a substantially triangle shape. Each of the magnetic poles 14c has a pair of side walls 14e opposing to one another, a inner wall 14f and a outer wall 14g. The inner wall 14e of each magnetic poles 14 opposes to the field winding 15 and the outer wall 14g of each magnetic poles 14 opposes to the inner surface of the a mature iron core 4 via small outer air gap.

Each of the magnetic poles 13c of the first rotor iron core 13 extends from the disk portion 13b to each space 14d between adjacent two of the magnetic poles 14c. Between each one of magnetic poles 13c and the adjacent one of magnetic poles 14c, a side gap G is formed. Each of the magnetic poles 14c of the second rotor iron core 14 extends from the disk portion 14b to each space 13d between adjacent two of the magnetic poles 14c. Between each one of magnetic poles 14c and the adjacent one of magnetic poles 13c, a narrow side gap G is formed.

The plurality of magnetic poles 13c and 14c are combined so that the plurality of magnetic cores 13c and 14c are meshed by forming the narrow side gap G with, each other. The magnetic poles 13c and 14c are formed so as to be reduced in thickness and width from the disk portions 13b, 14b toward the extremities thereof.

As shown in FIGS. 2 and 3, the rotor 10 further includes a plurality of first deformation preventing members 18 and a plurality of second deformation preventing members 19. Each of the first and second deformation preventing members 18, 19 is a plate member made of non-material, such as aluminum or stainless steel. Each of the first deformation preventing members 18 is attached on the inner wall 13f of each of the magnetic poles 13c of the first rotor iron core 13. Each of the second deformation preventing members 19 is attached on inner wall 14f of each of the magnetic poles 14c of the second rotor iron core 14.

Each of the first deformation preventing members 18 has a pair of elongated portions 18e bent radially outwardly of the rotor 10. Each of the elongated portions 18e is disposed in the side gap G and extends along the side wall 14e of each of the magnetic poles 14c. Each of the second deformation preventing members 19 has a pair of elongated portions 19e bent radially outward. Each of the elongated portions 19e is disposed in the side gap G and extends along the side wall 13e of each magnetic poles 13c. The elongated portions 18e are pressed against to the side walls 14e of each magnetic poles 14c of the second rotor iron core 14 at predetermined pressing force. This structure is effective to prevent the deformation of the magnetic poles 13c and 14c due to the centrifugal force. Also, the elongated portions 19e are pressed against to the side walls 13e of each magnetic poles 13c of the second rotor iron core 13 at predetermined pressing force. This structure is also effective to prevent the deformation of the magnetic poles 13c and 14c due to the centrifugal force.

The pressing force to side walls 13e, 14e is set to a value that produces a frictional force with respect to each of the magnetic poles 13c and 14c equal to or higher than outwardly widening force of the magnetic poles 13c and 14c caused by centrifugal force exerted on the magnetic poles 13c and 14c by the rotation of the rotor 10. The deformation preventing members 18 are formed of plate members of aluminum or non-magnetic steel so as not to close air ventilation in the axial direction and so as to prevent leakage of magnetic flux between the adjacent magnetic poles 13c and 14c.

With the rotor of the dynamo electric machine in this arrangement according to the first embodiment, outward deformation of the distal portions of the magnetic poles 13c and 14c due to the centrifugal force without impairing cooling effect of the rotor 10 and without deteriorating the characteristics of the magnetic circuit so as to resist the high-velocity revolution and reduce noise due to vibrations of the magnetic poles.

Second Embodiment

Figure 4:
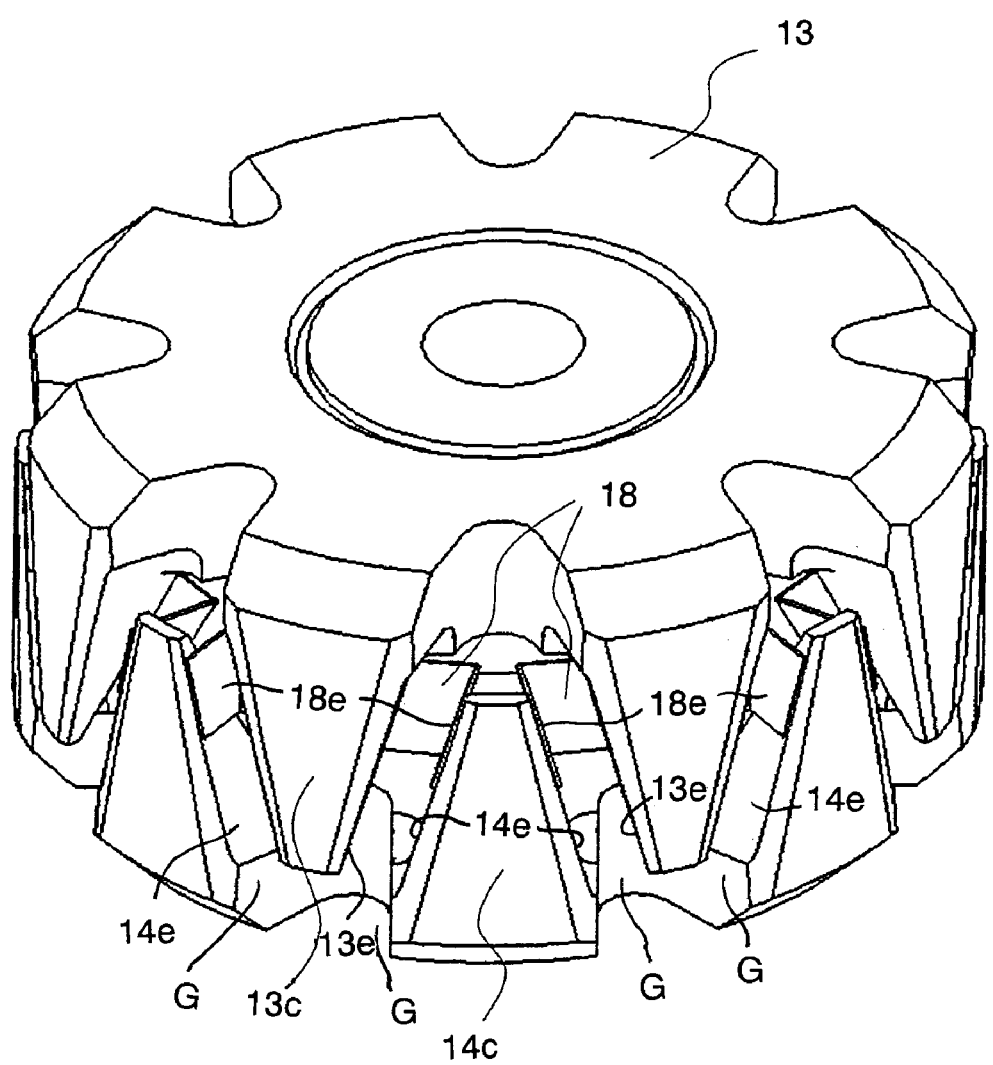
FIG. 4 is a perspective view illustrating the rotor for the dynamo-electric machine according to a second embodiment of the invention.

FIG. 4 illustrates the rotor for the dynamo-electric machine according to a second embodiment of the invention. In the rotor for the dynamo-electric machine according to this embodiment, the first deformation preventing members 18 are used as the embodiment 1, the second deformation preventing members 19 are eliminated. Each of the first deformation preventing members 18 is attached on the inner wall 13f on each of the magnetic poles 13c. Each of the elongated portions 18e is pressed aginst to the side wall 13e of each magnetic poles 13c. In this arrangement, good assembleability is achieved, and hence productivity is improved. In addition, since required material is reduced, the cost can be reduced. Consequently, a rotor of a dynamo-electric machine in which vibrations of the magnetic poles 13c and 14c are restrained and hence the reduction of the noise is achieved.

Third Embodiment

Figure 5:
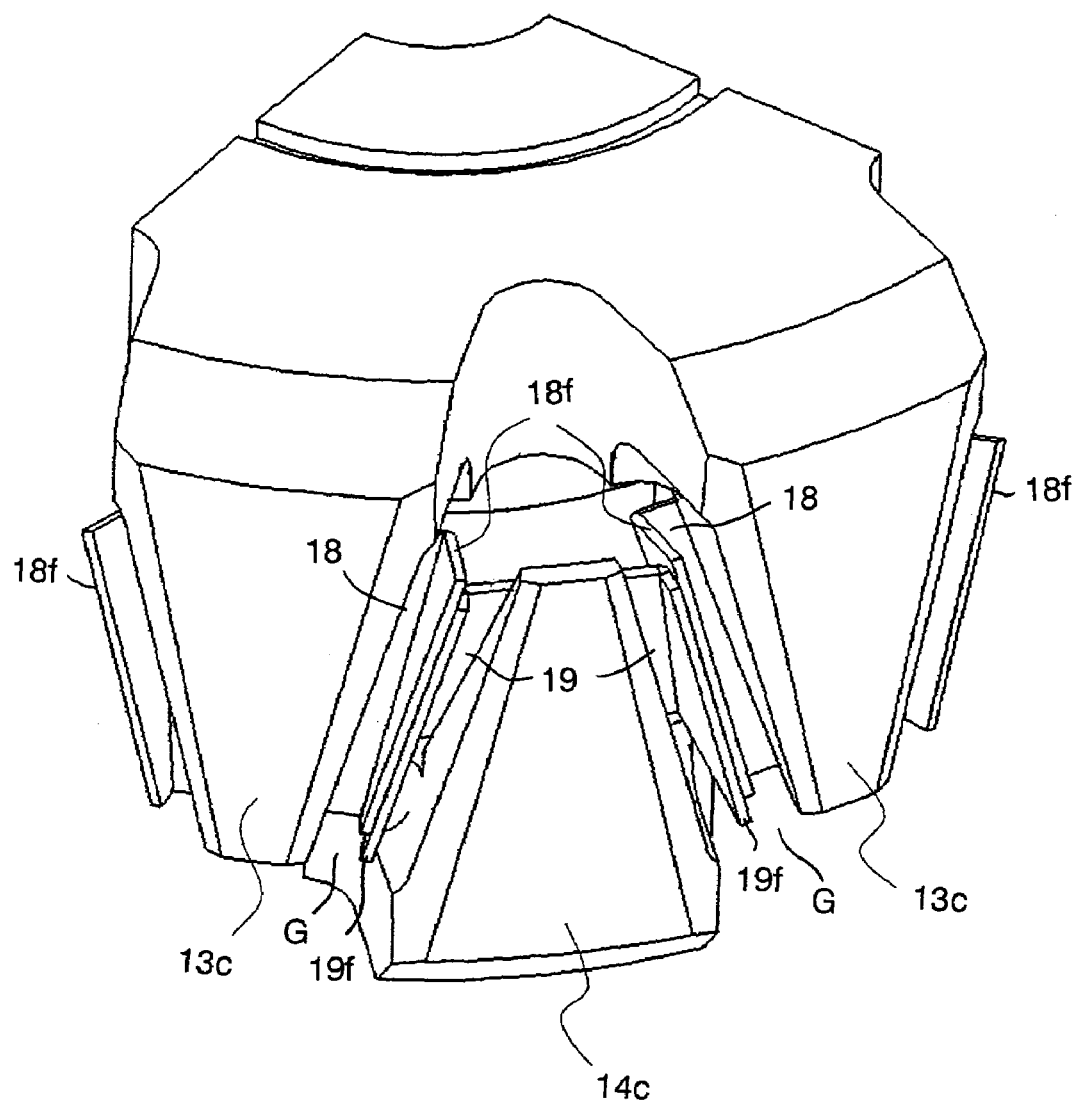
FIG. 5 is a perspective view illustrating the rotor for the dynamo-electric machine according to a third embodiment of the invention.

FIG. 5 illustrates the rotor for the dynamo-electric machine according to a third embodiment of the invention. In this third embodiment, each of the first deformation preventing members 18 has a pair of elongated portions 18f and each of the second deformation preventing members 19 has a pair of elongated portions 19f. Each of the elongated portions 18f, 19f is disposed at the center portion of the side gap G and the elongated portions 18f, 19f are combined to each other. Typically, the elongated portions 18f, 19f are pressed to each other at the predetermined pressing force.

It is also possible to adapt this press so as to change from linear contact at the beginning to surface contact by centrifugal force as the velocity revolution increases, and to mount the deformation preventing members 18 not on the inner wall 13f of the magnetic poles 13c, but on the side walls 13e thereof.

In this arrangement, the deformation preventing members 18, 19 are pressed to each another so that outerwardly movements of the deformation preventing members 18,19 are prevented and deformations and vibrations of the magnetic poles 13c and 14c due to the centrifugal force are prevented, whereby the rotor of the dynamo-electric motor generating low noise is achieved.

Fourth Embodiment

Figure 6:
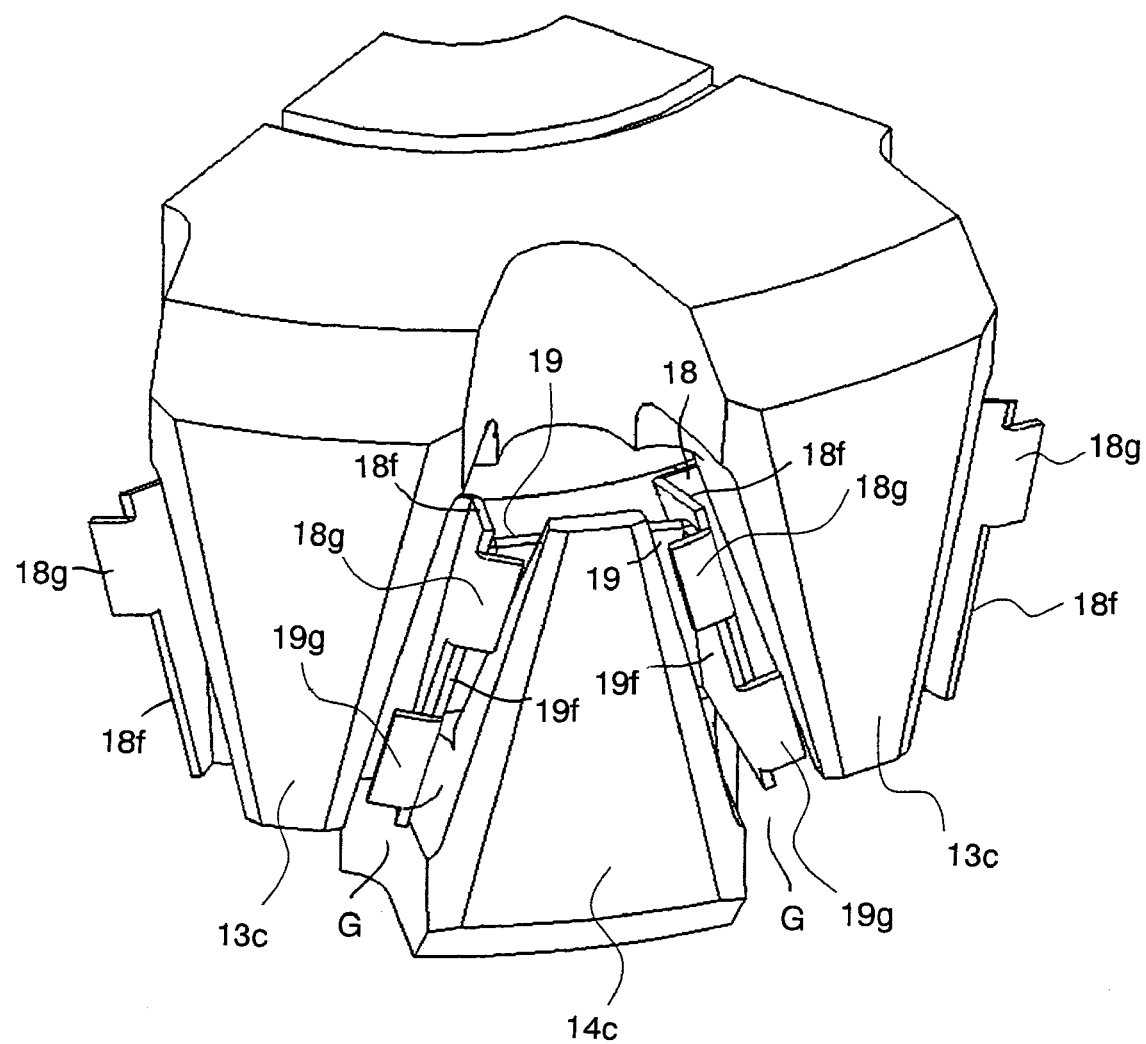
FIG. 6 is a perspective view illustrating the rotor for the dynamo-electric machine according to a fourth embodiment of the invention.

FIG. 6 illustrates the rotor of the dynamo-electric machine according to a fourth embodiment of the invention. In this fourth embodiment, each of the first deformation preventing members 18 has a pair of elongated portions 18f and a pair of folded portions 18g. Each of the folded portions 18g extends from the outer portion of the elongated portion 18f toward to the side wall 14e of each of the magnetic poles 14c. Each of the second deformation preventing members 19 has a pair of elongated portions 19f and a pair of folded portions 19g. Each of the folded portions 19g is extends from the outer portion of the elongated portion 19f toward to the side wall 13e of each of the magnetic poles 13. In this fourth embodiment, elongated portions 18f, 19f are not pressed to each other and are only opposed to each other, but the folded portion 18g is contacted with the outer portion of elongated portion 19f to prevent outerwardly movement of the elongated portion 19f and to prevent the deformation of each of the magnetic poles 14 due to the centrifugal force. The folded portion 19g is contacted with the outer portion of the elongated portion 18f to prevent the outer movement of the elongated portion 18f and to prevent the deformation of each of the magnetic poles 13c due to the centrifugal force.

The folded portion 18g is located at a one end portion of the elongated portion 18f adjacent to a root side of each magnetic poles 13c and the folded portion 18g is contacted with a one end portion of the elongated portion 19f adjacent to a distal side of each magnetic poles 14c. The folded portion 19g is located at a one end portion of the elongated portion 19f adjacent to a root side of each magnetic poles 14c and the folded portion 19g is contacted with a one end portion of the elongated portion 18f adjacent to a distal side of each magnetic poles 13. As the root sides of the magnetic poles 13c, 14c are strongly portions for the deformation due to the centrifugal force, above structure is effective to prevent the deformation of the distal sides of the magnetic poles 13c, 14c.

In the rotor of the dynamo-electric machine in this arrangement according to the fourth embodiment of the invention, the deformation of the distal portions of the magnetic poles 13c and 14c are restrained, and hence noise generated by vibrations or deformation caused by the centrifugal force is reduced.

Fifth Embodiment

Figure 7:
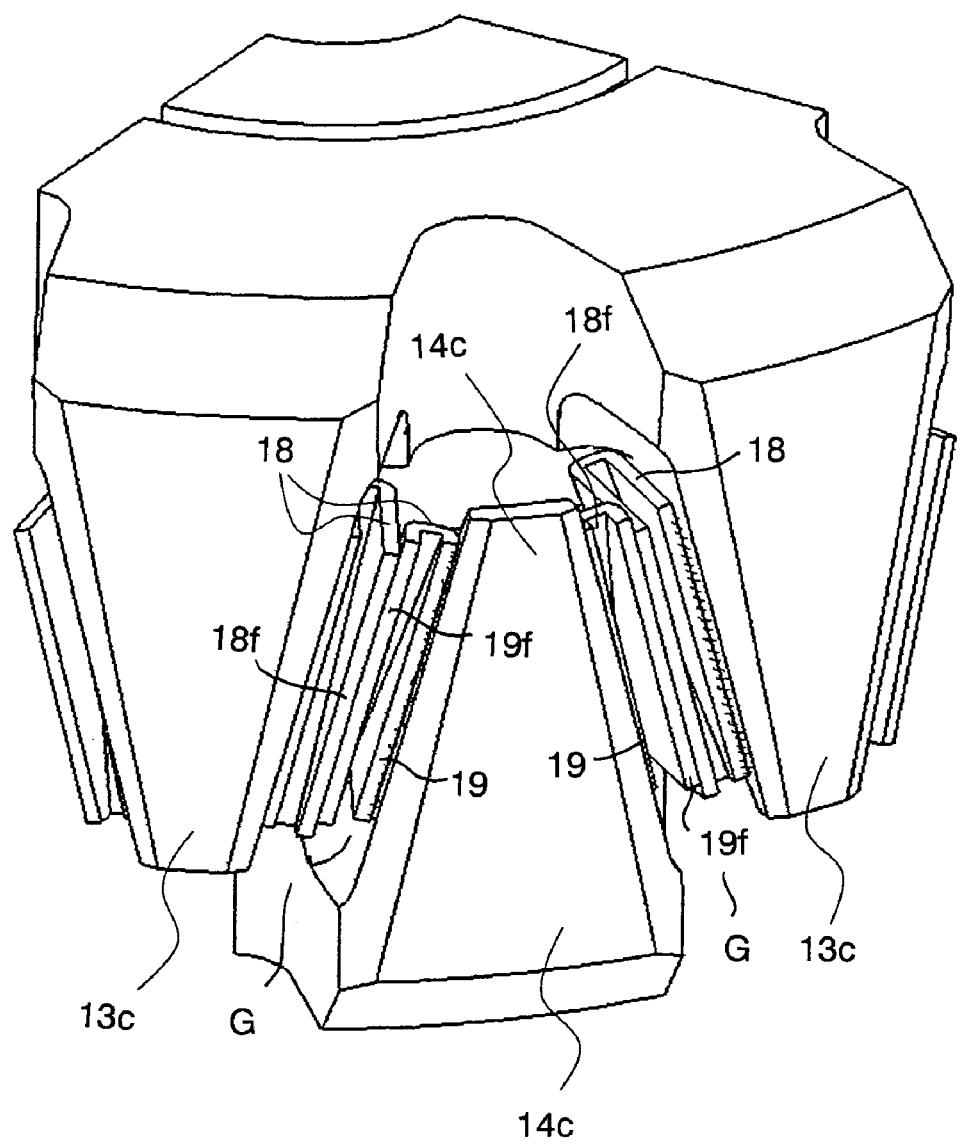
FIG. 7 is a perspective view illustrating the rotor for the dynamo-electric machine according to a fifth embodiment of the invention.

FIG. 7 illustrates the rotor of the dynamo-electric machine according to a fifth embodiment of the invention. In this fifth embodiment, the first deformation preventing members 18 are attached on the side walls 13e of each of the magnetic poles 13c and the second deformation preventing members 19 are attached on the side walls 14e of each of the magnetic poles 14c. The rotor of the dynamo-electric machine according to this embodiment will be described regarding mounting means of the above-described deformation preventing members 18 and 19.

In this embodiment, as shown in FIG. 7, the deformation preventing members 18, 19 are mounted to the side walls 13e, 14e of the magnetic poles 13c and 14c in the circumferential direction by welding. This mounting means for the deformation preventing members 18, 19 may not be welding and may be caulking or bonding. The mounting means for the deformation preventing members 18,19 can be applied to the first to fourth embodiments described above.

In this arrangement, mounting of the deformation preventing members 18, 19 can be facilitated and the structure of the rotor 10 which can reduce material cost and can resist the centrifugal force is achieved.

Sixth Embodiment

Figure 8:
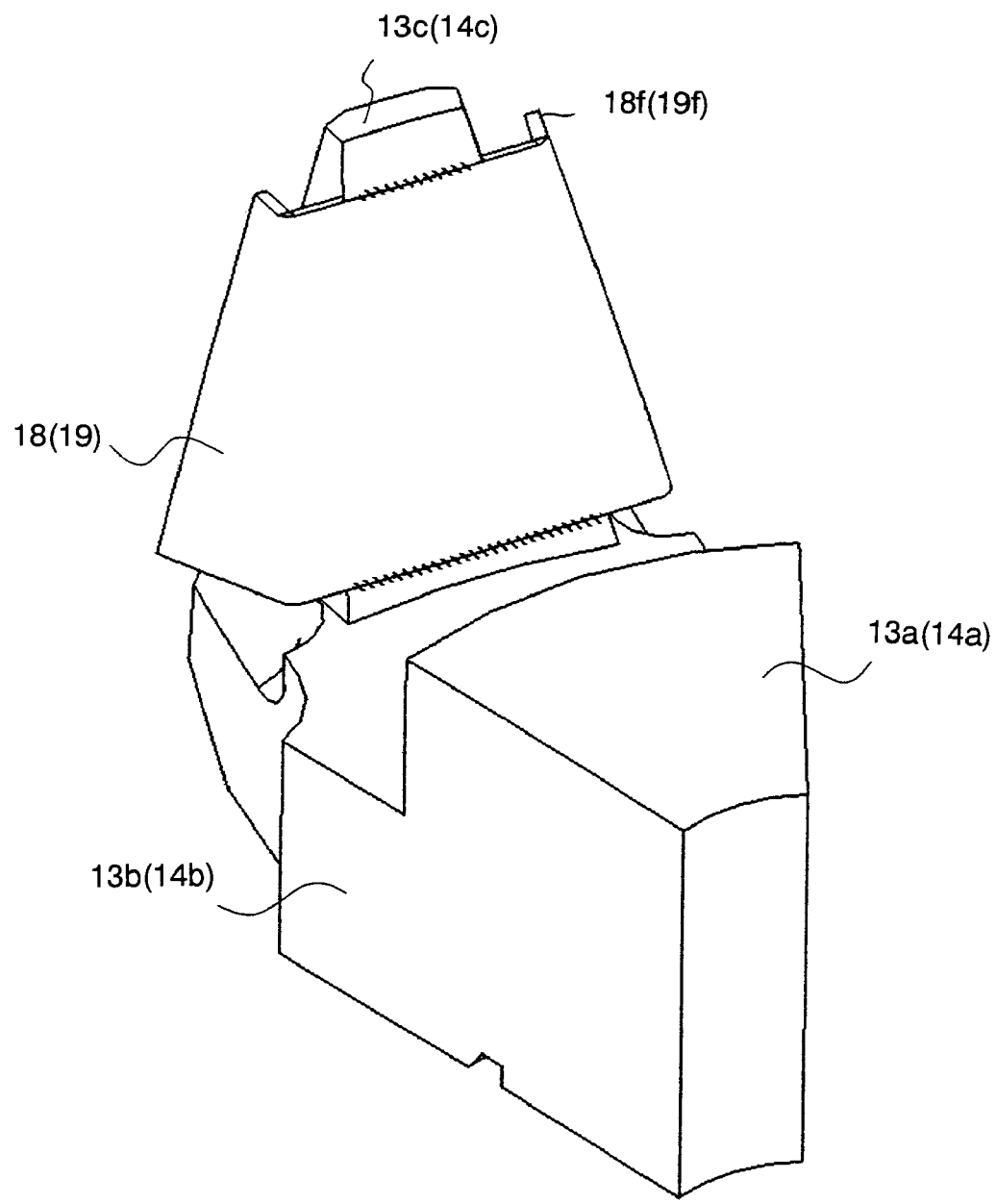
FIG. 8 is a perspective view illustrating the rotor for the dynamo-electric machine according to a sixth embodiment of the invention.

FIG. 8 illustrates the rotor of the dynamo-electric machine according to a sixth embodiment of the invention. The rotor of the dynamo-electric machine according to this embodiment will also be described regarding mounting means for the deformation preventing members 18, 19. As shown in FIG. 8, the deformation preventing members 18 are attached to the inner walls 13f and 14f of the magnetic poles 13c and 14c by welding, and welding may be replaced by caulking, fitting or bonding. As a matter of course, the joint position is not limited to both ends of the deformation preventing members 18,19 that is, the position shown in the drawing, but may be any position as long as they are the contact surfaces between the deformation preventing members 18 and the magnetic poles 13c or 14c.

In this arrangement, resistance of the deformation preventing members 18, 19 against the centrifugal force may have a sufficient strength. In addition, as long as the deformation preventing members 18,19 are formed of non-magnetic material, even though the welded portions are swelled and hence magnetization varies due to welding heat, does not affect the magnetic circuit, and hence no influence is exercised over the performance of the dynamo-electric machine.

Seventh Embodiment

Figure 9:
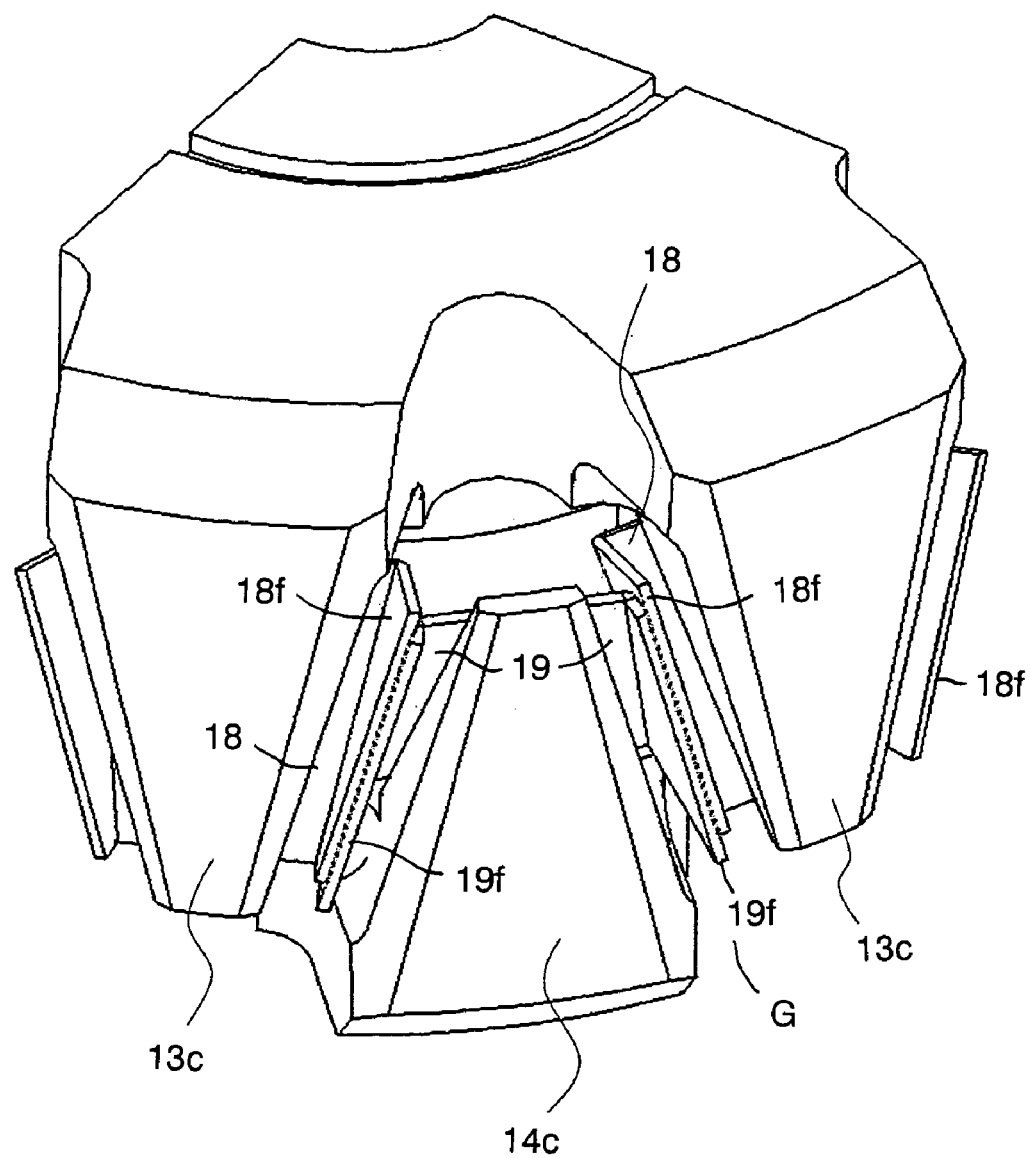
FIG. 9 is a perspective view illustrating the rotor for the dynamo-electric machine according to a seventh embodiment of the invention.

FIG. 9 illustrates the rotor of the dynamo-electric machine according to a seventh embodiment of the invention. The rotor of the dynamo-electric machine according to this embodiment will be described regarding mounting means for the deformation preventing members 18, 19 to the respective magnetic poles 13c and 14c and subsequent fixation between the adjacent deformation preventing members 18, 19 or fixation between the deformation preventing members 18, 19 and adjacent magnetic poles 13c or 14c. Fixation between the deformation preventing members 18, 19 or fixation between the deformation preventing member 18,19 and the adjacent magnetic poles 13c or 14c are done using thermosetting adhesive agent, silicon contained adhesive agent, or resin contained adhesive agent, and voids required for bonding are formed between portions to be adhered.

In this arrangement, vibration preventing effect is generated between the magnetic poles 13c and 14c, and hence generation of abnormal noise in association with vibrations is restrained. In addition, since fixation between the entire surfaces of the deformation preventing members 18, 19 or fixation between the entire surface between the deformation preventing member 18, 19 and the adjacent magnetic poles 13c or 14c is enabled, resistance against the centrifugal force is also increased.

Eighth Embodiment

Figure 10:
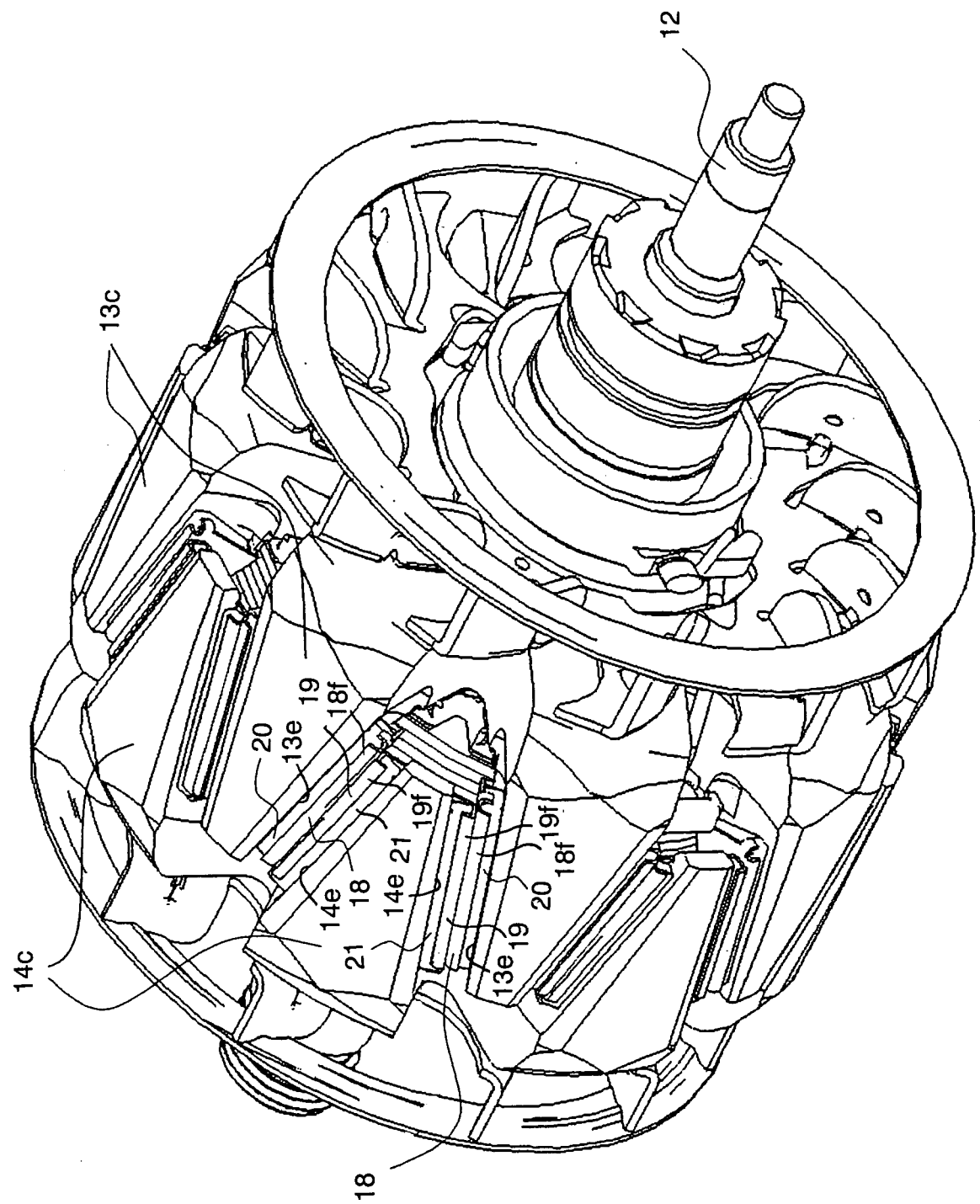
FIG. 10 is a perspective view illustrating the rotor for the dynamo-electric machine according to an eighth embodiment of the invention.

FIG. 10 is a perspective view illustrating the rotor of the dynamo-electric machine according to an eighth embodiment of the invention. In this eighth embodiment, a plurality of first permanent magnet 20 and a plurality of second permanent magnet 21 are used.

The plurality of first permanet magnet 20 are combined with the first deformation preventing members 18 attached to the magnetic poles 13c. Each of the first deformation preventing members 18 has a pair of the elongated portion 18f extending to the center portions of the side gap G each of the first permanent magnets 20 is disposed between the side wall 13e of each of the magnetic poles 13 and the elongated portion 18f of the first deformation preventing members 18.

Each of the magnetic poles 13 is magnetically energized with N-polarity. Each of the first permanent magnets 20 is magnetized in the opposing direction of the side wall 13e and the elongated portion 18f. Each of the first permanent magnets 20 is arranged so that its one magnetic pole of N-polarity is contacted to the side wall 13e and its another one magnetic pole of S-polarity is contacted to the elongated portion 18f.

The plurality of second permanent magnets 21 are combined with the second deformation preventing members 19 attached to the magnetic poles 14c. Each of the second deformation preventing members 19 has a pair of the elongated portion 19f extending to the center portions of the side gap G. Each of the second permanent magnets 21 is disposed between the side wall 14e of each of the magnetic poles 14 and the elongated portion 19f of the second deformation preventing members 19.

Each of the magnetic poles 14 is magnetically energized with S-polarity. Each of the second permanent magnets 21 is magnetized in the opposing direction of the side wall 14e and the elongated portion 19f. Each of the second permanent magnets 21 is arranged so that its one magnetic pole of S-polarity is contacted to the side wall 14e and its another one magnetic pole of N-polarity is contacted to the elongated portion 19f.

A leakage flux in the side gap G between each of the magnetic poles 13c and each of the magnetic poles 14c flow through the side gap G from the magnetic pole 13c of N-polarity to the magnetic pole 14c of S-polarity. The magnetic fluxes of the first and second permanent magnets 20, 21 in above arrangement oppose to the leakage flux, and make to reduce the leakage flux in the side gap G.

The rotor of the dynamo electric machine according to this embodiment is configured in such a manner that permanent magnet 20, 21 are held between the magnetic poles 13c and 14c and the deformation preventing members 18, 19. The centrifugal force applied to the first and second permanent magnets 19 is supported by the deformation preventing members 18, mutual fixation is achieved between the adjacent deformation preventing members 18, 19 as described in the third, fourth, and seventh embodiments, and vibration preventing measure or measure against the centrifugal force are exercised for the magnetic poles 13c or 14c.

In this arrangement, the leakage flux at the side gap G between magnetic pole 13c and 14c is restrained, and hence the performance of the dynamo-electric machine can be improved. In addition, since the centrifugal force exerted to the permanent magnets 20, 21 are supported by the deformation preventing members 18,19 lowering of the maximum velocity of revolution due to provision of the permanent magnets 19 is prevented, and deformation of the distal sides the magnetic poles 13c and 14c is retrained, thereby enabling reduction of noise due to vibrations.

What is claimed is:

1. A rotor for a dynamo-electric machine comprising a rotating shaft, a field winding, and first and second rotor cores,
   wherein each of the first and second rotor core includes a cylindrical portion, a disk portion and a plurality of magnetic poles, the cylindrical portion of each of the first and second rotor cores is fixed to the rotating shaft and the field winding is disposed on the cylindrical portions of the first and second rotor cores, the disk portion of each of the first and second rotor cores is provided so as to extend from the cylindrical portion in a radial direction, the plurality of magnetic poles of each of the first and second rotor cores extend from the disk portion in an axial direction so as to form spaces between each of adjacent magnetic poles, each of the plurality of magnetic poles of the first rotor core extends to a corresponding one of the spaces between adjacent magnetic poles of the second rotor core, and each of the plurality of magnetic poles of the second rotor core extends to a corresponding one of the spaces between adjacent magnetic poles of the first rotor core,
   wherein the rotor further comprises a plurality of first deformation preventing members of non-magnetic material, each of the first deformation preventing members is attached to a corresponding one of magnetic poles of the first rotor core,
   each of the first deformation preventing members includes a pair of elongated portions, each of the elongated portions is pressed against a side wall of a corresponding one of the magnetic poles of the second rotor core at a predetermined pressing force.

2. The rotor according to claim 1, wherein the rotor further comprises a plurality of second deformation preventing members of non-magnetic material, each of the second deformation preventing members is attached a corresponding one of the magnetic poles of the second rotor core,
   each of the second deformation preventing members includes an elongated portion which is pressed against a side wall of a corresponding one of the magnetic poles of the first rotor core at a predetermined pressing force.

3. The rotor according to claim 2, wherein each of the second deformation preventing members includes a pair of the elongated portions, each of the elongated portions of each of the second another deformation preventing members is pressed against to the side wall of the corresponding one of the magnetic poles of the first rotor core at a predetermined pressing force.

4. The rotor according to claim 1, wherein each of the deformation preventing members is attached to an inner wall of the corresponding one of the magnetic poles of the first rotor core.

5. The rotor according to claim 1, wherein each of the deformation preventing members is attached to a side wall of a corresponding one of the magnetic poles of the first rotor core.

6. A rotor of a dynamo-electric machine comprising a rotating shaft, a field winding, and first and second rotor cores,
   wherein each of the first and second rotor core includes a cylindrical portion, a disk portion and a plurality of magnetic poles, the cylindrical portion of each of the first and second rotor cores is fixed to the rotating shaft and the field winding is disposed on the cylindrical portions of the first and second rotor cores, the disk portion of each of the first and second rotor cores is provided so as to extend from the cylindrical portion in a radial direction, the plurality of magnetic poles of each of the first and second rotor cores extend from the disk portion in an axial direction so as to form spaces between each of adjacent magnetic poles, each of the plurality of magnetic poles of the first rotor core extends to a corresponding one of the spaces between adjacent magnetic poles of the second rotor core, and each of the plurality of magnetic poles of the second rotor core extends to a corresponding one of the spaces between adjacent magnetic poles of the first rotor core, wherein the rotor further comprises a plurality of first and second deformation preventing members of non-magnetic material, each of the first deformation prevent members is attached to a corresponding one of magnetic poles of the first rotor core, each of the second deformation preventing members is attached to a corresponding one of magnetic poles of the second rotor core, and the first deformation preventing members contact the second deformation preventing members at gaps formed between the magnetic poles of the first rotor core and the magnetic poles of the second rotor core that are adjacent to the magnetic poles of the first rotor core so that the first deformation preventing members prevent movement of the second deformation preventing members in the radial direction and the second deformation preventing members prevent movement of the first deformation preventing members in the radial direction.

7. The rotor according to claim 6, wherein each of the first deformation preventing members has a elongated portion facing a side wall of a corresponding one of the magnetic poles of the first rotor core, each of the second deformation preventing members has a second elongated portion facing a side wall of a corresponding one of the magnetic poles of the second rotor core, and the elongated portion of each of the first deformation preventing members and the elongated portion of each of the second deformation preventing members contact each other.

8. The rotor according to claim 7, wherein the elongated portion of each of the first deformation members and the elongated portion of each of the second deformation preventing members are pressed to each other.

9. The rotor according to claim 7, wherein the elongated portion of each of the first deformation members and the elongated portion of each of the second deformation preventing members are adhered to each other.

10. The rotor according to claim 7, wherein the rotor further comprises a plurality of first and second permanent magnets, each of the first permanent magnet is disposed between the side wall of a corresponding one of the magnetic poles of the first rotor core and the elongated portion of a corresponding one of the first deformation preventing portions, and each of the second permanent magnets is disposed between the side wall of a corresponding one of the magnetic poles of the second rotor core and the elongated portion of a corresponding one of the second deformation preventing members.

11. The rotor according to claim 10, wherein each of the magnetic poles of the first rotor core is magnetized with a first magnetic polarity and each of the magnetic poles of the second rotor core is magnetized with a second magnetic polarity when the field winding is energized by direct current, each of the first permanent magnets contacts the side wall of the corresponding one of the magnetic poles of the first rotor core, and each of the second permanent magnets contacts the side wall of the corresponding one of the magnetic poles of the second rotor core.

12. The rotor according to claim 6, wherein each of the first deformation preventing members has a elongated portion facing a side wall of the corresponding one of the magnetic poles of the first rotor core and a folded portion extending from the elongated portion toward to a side wall of a corresponding one of the magnetic poles of the second rotor core, each of the second deformation preventing members has a elongated portion facing a side wall of the corresponding one of the magnetic poles of the second rotor core and a folded portion extending from the elongated portion of the second deformation preventing member toward to a side wall of a corresponding one of the magnetic poles of the first rotor core, the folded portion of each of the first deformation preventing members contacts the elongated portion of the corresponding one of the second deformation preventing members, and the folded portion of each of the second deformation preventing members contacts the elongated portion of the corresponding one of the first deformation preventing members.

13. The rotor according to claim 12, wherein the folded portion of each of the first deformation preventing members is located at an end portion of the elongated portion adjacent to a root side of the corresponding one of the magnetic poles of the first rotor core and the folded portion of each of the second deformation preventing members is located at an end portion of the elongated portion adjacent to a root side of the corresponding one of the magnetic poles of the second rotor core.

14. The rotor according to claim 6, wherein each of the first deformation preventing members is attached to an inner wall of the corresponding one of the magnetic poles of the first rotor core and each of the second deformation preventing members is attached to an inner wall of the corresponding one of the magnetic poles of the second rotor core.

15. The rotor according to claim 6, wherein each of the first deformation preventing members is attached to a side wall of a corresponding one of the magnetic poles of the first rotor core and each of the second deformation preventing members is attached to a side wall of a corresponding one of the magnetic poles of the second rotor core.

* * * * *